(12) United States Patent
Patel et al.

(10) Patent No.: US 10,378,775 B2
(45) Date of Patent: *Aug. 13, 2019

(54) COMBUSTOR HEAT SHIELD

(75) Inventors: Bhawan B. Patel, Mississauga (CA); Oleg Morenko, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 775 days.

This patent is subject to a terminal disclaimer.

(21) Appl. No.: 13/427,944

(22) Filed: Mar. 23, 2012

(65) Prior Publication Data

US 2013/0247575 A1 Sep. 26, 2013

(51) Int. Cl.
| | |
|---|---|
| *F23R 3/00* | (2006.01) |
| *F23R 3/10* | (2006.01) |
| *F23R 3/54* | (2006.01) |
| *F23R 3/04* | (2006.01) |
| *F23R 3/60* | (2006.01) |

(Continued)

(52) U.S. Cl.
CPC ............... *F23R 3/10* (2013.01); *F02C 3/145* (2013.01); *F02C 7/20* (2013.01); *F02C 7/24* (2013.01); *F23R 3/002* (2013.01); *F23R 3/04* (2013.01); *F23R 3/06* (2013.01); *F23R 3/54* (2013.01); *F23R 3/60* (2013.01); *F05D 2260/20* (2013.01); *F05D 2260/201* (2013.01); *F05D 2260/202* (2013.01); *F05D 2260/203* (2013.01); *F05D 2260/22141* (2013.01); *F05D 2260/231* (2013.01); *F23R 2900/03041* (2013.01); *F23R 2900/03043* (2013.01); *F23R 2900/03044* (2013.01); *Y10T 29/4932* (2015.01)

(58) Field of Classification Search
CPC .... F02C 1/10; F02C 3/145; F02C 7/20; F02C 7/24; F02G 3/00; F23R 3/002; F23R 3/60; F23R 3/04; F23R 3/06; F23R 3/54; F23R 2900/03041; F23R 2900/03043; F23R 2900/03044; F05D 2260/20; F05D 2260/201; F05D 2260/202; F05D 2260/203; F05D 2260/22141
USPC .................. 60/752, 754, 755, 756, 760, 796
See application file for complete search history.

(56) References Cited

U.S. PATENT DOCUMENTS

| | | |
|---|---|---|
| 2,959,003 A | 11/1960 | Carlisle et al. |
| 3,385,055 A | 5/1968 | Koblish et al. |

(Continued)

*Primary Examiner* — Gerald L Sung
*Assistant Examiner* — Marc J Amar
(74) *Attorney, Agent, or Firm* — Norton Rose Fulbright Canada LLP

(57) ABSTRACT

A heat shield for a gas turbine engine having a combustor includes an annular configuration extending substantially 360 degrees about the combustor for protecting a dome portion thereof, which is formed by radially extending flanges of inner and outer liners of the combustor. The heat shield fixedly secures the radially extending flanges of the inner and outer liners together in a sealing relationship such as to structurally form the dome portion of the combustor. The heat shield is disposed internally within the combustor and substantially entirely overlying the dome portion. The heat shield includes at least two separate heat shield segments cooperating to provide the annular heat shield, each heat shield segment being sheet metal and including at least two circumferentially spaced apart openings therein for receiving fuel nozzles therethrough. Each of the heat shield segments has a circumferential span not exceeding 180 degrees.

20 Claims, 6 Drawing Sheets

(51) Int. Cl.
*F23R 3/06* (2006.01)
*F02C 7/20* (2006.01)
*F02C 3/14* (2006.01)
*F02C 7/24* (2006.01)

(56) References Cited

U.S. PATENT DOCUMENTS

| | | | |
|---|---|---|---|
| 4,241,586 A * | 12/1980 | Caruel | F23R 3/002 60/738 |
| 4,322,945 A | 4/1982 | Peterson et al. | |
| 4,749,029 A * | 6/1988 | Becker et al. | 165/47 |
| 4,843,825 A * | 7/1989 | Clark | F23R 3/002 60/756 |
| 5,117,637 A | 6/1992 | Howell et al. | |
| 5,220,786 A | 6/1993 | Campbell | |
| 5,233,822 A * | 8/1993 | Ward | F01D 25/285 60/39.37 |
| 5,241,827 A * | 9/1993 | Lampes | 60/754 |
| 5,253,471 A * | 10/1993 | Richardson | F23R 3/10 60/754 |
| 5,271,219 A * | 12/1993 | Richardson | F23R 3/10 60/39.11 |
| 5,279,127 A * | 1/1994 | Napoli | F02K 1/822 60/754 |
| 5,329,761 A | 7/1994 | Ablett et al. | |
| 5,363,643 A * | 11/1994 | Halila | F23R 3/002 60/752 |
| 5,419,115 A | 5/1995 | Butler et al. | |
| 5,490,378 A | 2/1996 | Berger et al. | |
| 5,956,955 A * | 9/1999 | Schmid | F23R 3/283 60/748 |
| 6,035,645 A | 3/2000 | Bensaadi et al. | |
| 6,047,539 A | 4/2000 | Farmer | |
| 6,279,323 B1 | 8/2001 | Monty et al. | |
| 6,581,386 B2 | 6/2003 | Young et al. | |
| 6,679,063 B2 | 1/2004 | Ebel | |
| 6,725,667 B2 | 4/2004 | Farmer et al. | |
| 6,880,341 B2 | 4/2005 | Parkaman et al. | |
| 6,986,253 B2 | 1/2006 | Leen et al. | |
| 7,021,061 B2 | 4/2006 | Tiemann | |
| 7,140,189 B2 * | 11/2006 | Markarian | F23R 3/10 60/796 |
| 7,509,813 B2 * | 3/2009 | Stastny | F23R 3/50 60/752 |
| 7,543,383 B2 * | 6/2009 | Patel | B22F 3/22 29/890.14 |
| 7,614,235 B2 * | 11/2009 | Burd | F23R 3/002 60/752 |
| 7,631,503 B2 * | 12/2009 | Stastny | F23R 3/002 60/752 |
| 7,681,398 B2 * | 3/2010 | Patel et al. | 60/752 |
| 7,690,207 B2 * | 4/2010 | Markarian | F23R 3/002 60/752 |
| 7,748,221 B2 * | 7/2010 | Patel et al. | 60/752 |
| 7,827,800 B2 * | 11/2010 | Stastny | F23R 3/002 60/39.11 |
| 7,845,174 B2 * | 12/2010 | Parkman | F23R 3/60 60/752 |
| 7,854,126 B2 * | 12/2010 | Hernandez | F23C 5/02 60/752 |
| 7,861,530 B2 | 1/2011 | Hawie et al. | |
| 7,926,280 B2 * | 4/2011 | Morenko | F23R 3/002 60/740 |
| 8,171,736 B2 * | 5/2012 | Hawie | F23R 3/10 60/752 |
| 8,316,541 B2 * | 11/2012 | Patel | F23R 3/002 29/889.22 |
| 8,984,896 B2 * | 3/2015 | Davenport | F23R 3/002 60/752 |
| 9,322,560 B2 * | 4/2016 | Erbas-Sen | F23R 3/04 |
| 9,328,926 B2 * | 5/2016 | Penz | F23R 3/002 |
| 9,557,060 B2 * | 1/2017 | Papple | F23R 3/04 |
| 9,644,843 B2 * | 5/2017 | Herborth | F23R 3/002 |
| 9,982,890 B2 * | 5/2018 | Papple | F23R 3/002 |
| 10,012,390 B2 * | 7/2018 | Bake | F23R 3/60 |
| 2003/0014935 A1 * | 1/2003 | Bodnar | 52/481.1 |
| 2004/0076465 A1 * | 4/2004 | Geiger | 403/278 |
| 2006/0042269 A1 * | 3/2006 | Markarian | F23R 3/10 60/796 |
| 2006/0196188 A1 * | 9/2006 | Burd | F23R 3/002 60/754 |
| 2007/0062198 A1 | 3/2007 | Huth et al. | |
| 2007/0200012 A1 * | 8/2007 | Hernandez | F23C 5/02 239/548 |
| 2008/0016874 A1 * | 1/2008 | Markarian | F23R 3/002 60/772 |
| 2008/0053103 A1 * | 3/2008 | Stastny | F23R 3/50 60/782 |
| 2008/0060360 A1 * | 3/2008 | Stastny | F23R 3/002 60/752 |
| 2008/0092546 A1 * | 4/2008 | Stastny | F23R 3/002 60/752 |
| 2008/0115499 A1 * | 5/2008 | Patel | F23R 3/10 60/752 |
| 2008/0178599 A1 * | 7/2008 | Hawie | F23R 3/10 60/752 |
| 2008/0229750 A1 * | 9/2008 | Sipson | F23R 3/60 60/734 |
| 2008/0256955 A1 * | 10/2008 | Parkman | F23R 3/002 60/752 |
| 2008/0282703 A1 * | 11/2008 | Morenko | F23R 3/002 60/796 |
| 2009/0000303 A1 * | 1/2009 | Patel | F23R 3/002 60/752 |
| 2009/0025224 A1 * | 1/2009 | Patel | B22F 3/22 29/890.142 |
| 2011/0000216 A1 * | 1/2011 | Imamura | F23R 3/14 60/748 |
| 2011/0240398 A1 * | 10/2011 | Vezina | 180/312 |
| 2012/0240583 A1 * | 9/2012 | Penz | F23R 3/002 60/722 |
| 2014/0090402 A1 * | 4/2014 | Erbas-Sen | F23R 3/04 60/806 |
| 2015/0052901 A1 * | 2/2015 | Davenport | F23R 3/002 60/752 |
| 2015/0096302 A1 * | 4/2015 | Herborth | F23R 3/002 60/752 |
| 2015/0135720 A1 * | 5/2015 | Papple | F01D 5/186 60/759 |
| 2015/0362191 A1 * | 12/2015 | Papple | F23R 3/04 60/772 |
| 2016/0010869 A1 * | 1/2016 | Bake | F23R 3/60 60/798 |

* cited by examiner

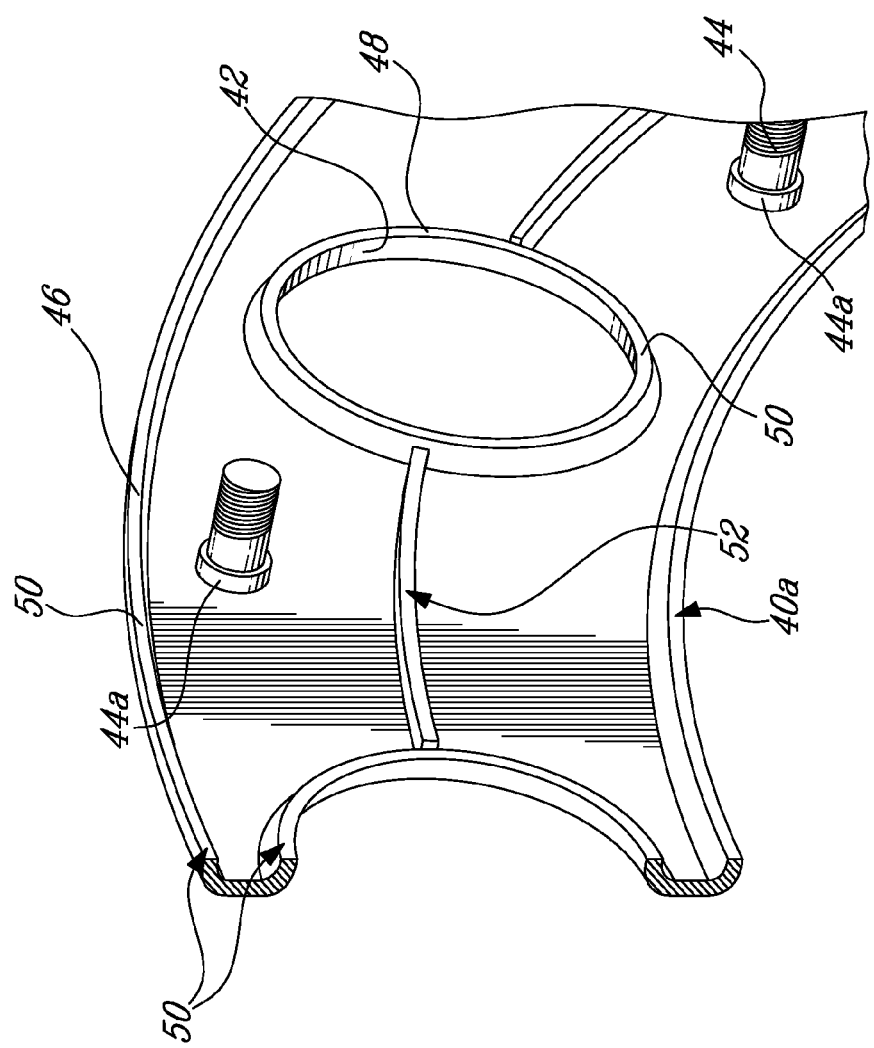

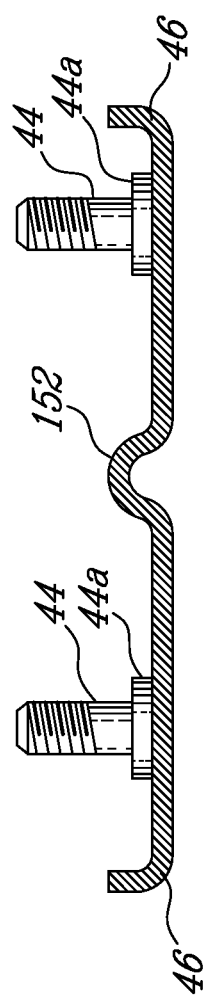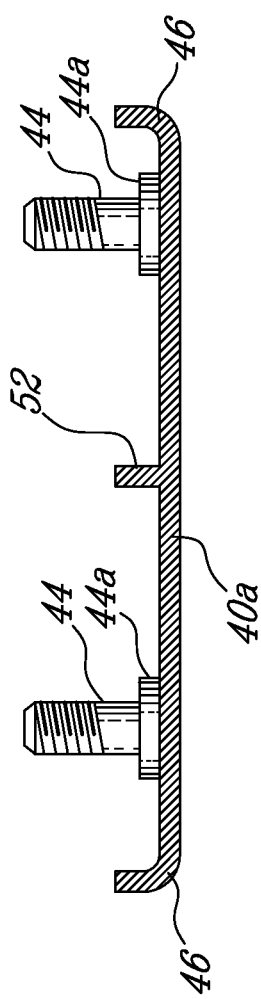

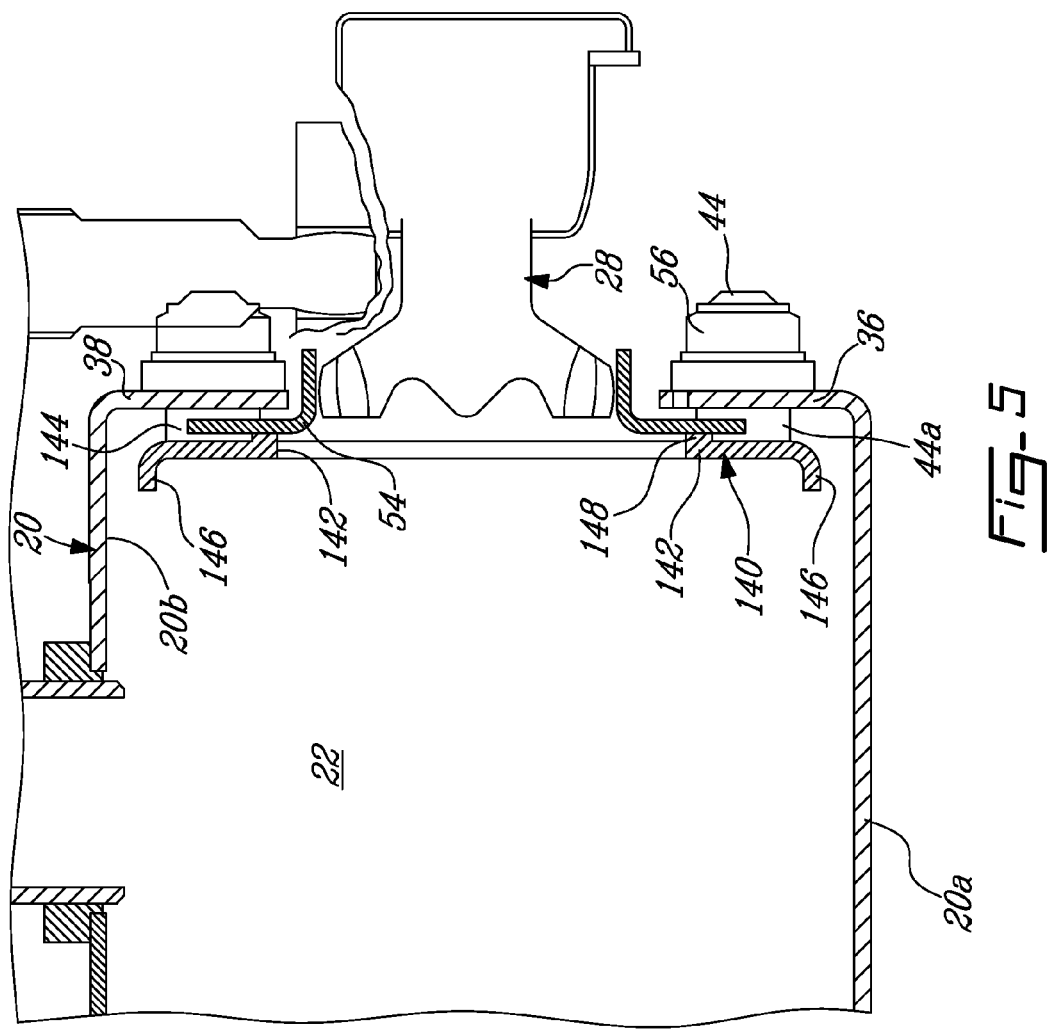

COMBUSTOR HEAT SHIELD

TECHNICAL FIELD

The present invention relates generally to gas turbine engine combustors and, more particularly, to a low cost combustor heat shield configuration therefor.

BACKGROUND OF THE ART

Gas turbine combustors are the subject of continual improvement, to provide better cooling, better mixing, better fuel efficiency, better performance, etc. at a lower cost. For example, heat shields are known to provide better protection to the combustor, but heat shields also require cooling. Although heat shield cooling schemes are known in the art, most are generally difficult to assemble. There remains a continuing need for improvement.

SUMMARY

In accordance with one aspect there is provided a heat shield for a gas turbine engine having a combustor defining a combustion chamber therein, the combustor being formed by cooperating inner and outer liners, the heat shield comprising an annular configuration extending substantially 360 degrees about the combustor for protecting a dome portion thereof which is formed by radially extending flanges of the inner and outer liners, the heat shield fixedly securing the radially extending flanges of the inner and outer liners together in a sealing relationship such as to structurally form the dome portion of the combustor, the heat shield being disposed internally within the combustor and substantially entirely overlying the dome portion, the heat shield including at least two separate heat shield segments cooperating to provide the annular heat shield, each said heat shield segment being sheet metal and including at least two circumferentially spaced apart openings therein for receiving fuel nozzles therethrough, and wherein each said heat shield segment has a circumferential span not exceeding 180 degrees.

There is also provided a gas turbine engine combustor comprising a liner enclosing a combustion chamber and being formed of cooperating inner and outer liners, an annular heat shield mounted inside the combustor adjacent a dome portion thereof which is formed by radially extending flanges of the inner and outer liners, the annular heat shield being axially spaced apart from the dome portion to define an air space therebetween, the annular heat shield fixedly securing the radially extending flanges of the inner and outer liners together in a sealing relationship such as to structurally form the dome portion of the combustor, the dome portion of the combustor and heat shield each having a plurality of circumferentially spaced apart fuel nozzle openings defined therein which are respectively circumferentially aligned to receive fuel nozzles therethrough, the heat shield further comprising at least two separately formed and circumferentially extending segments which are mounted end-to-end to form the annular heat shield, each said segment being sheet metal and including at least two of said fuel nozzle openings therein, and wherein each said segment has a circumferentially extending span not exceeding 180 degrees.

In accordance with another aspect there is also provided a combustor liner and heat shield combination comprising at least separate inner and outer annular shells having radial flanges at one end which define, together with a segmented heat shield, a dome surrounding an array of fuel nozzles, the heat shield further comprising at least two sections with each section having an annular span less than 180° and including at least two fuel nozzle receiving openings therein, the heat shield sections and the liner shells being interlocked in an integrated assembly to form a combustor dome assembly.

In one particular embodiment of the above-reference combustor liner and heat shield combination, the heat shield sections include studs with each stud including a shank in a collar with a collar being adjacent the heat shield and extending a distance corresponding to the air space required between the heat shield and the flanges, the shanks passing through the flanges to receive a locking fastener to thereby interlock the heat shield and the flanges to form the dome.

In another particular embodiment of the above-reference combustor liner and heat shield combination, lips are formed along the edges of the heat shield sections and extending perpendicular to the heat shield sections to sealing engage the flanges.

In another particular embodiment of the above-reference combustor liner and heat shield combination, lips are formed along the edges of the heat shield sections and extending in a direction away from the flanges will allow cooling air to flow freely along the liner walls.

There is further provided a method of assembling a gas turbine engine combustor defining a combustion chamber therein comprising: providing inner and outer annular liner shells with radially extending flanges at an upstream end thereof which define a portion of the combustor dome; assembling a plurality of heat shield segments in an annular configuration within the combustion chamber adjacent the flanges at the combustor dome; and attaching fasteners to interconnect the heat shield segments and the radially extending flanges of the combustor liner to form an integrated dome of the combustor, including fastening the heat shield segments in place such as to maintain air cooling spaces between the heat shield segments and the radially extending flanges of the combustor dome.

A method of assembling a gas turbine engine combustor defining a combustion chamber therein comprising: providing inner and outer annular liner shells with radially extending flanges at an upstream end thereof which define a portion of the combustor dome; assembling a plurality of heat shield segments in an annular configuration within the combustion chamber adjacent the flanges at the combustor dome; and attaching fasteners to interconnect the heat shield segments and the radially extending flanges of the combustor liner to form an integrated dome of the combustor, including fastening the heat shield segments in place such as to maintain air cooling spaces between the heat shield segments and the radially extending flanges of the combustor dome.

Further details of these and other aspects of the present invention will be apparent from the detailed description and Figures included below.

BRIEF DESCRIPTION OF THE DRAWINGS

Reference is now made to the accompanying Figures depicting aspects of the present invention, in which:

FIG. 3b shows an enlarged perspective view of a detail shown in FIG. 3a;

FIG. 4a is a cross-section of one embodiment of a detail shown in FIG. 3b;

FIG. 4b is a cross-section similar to FIG. 4a, showing a different embodiment; and FIG. 5 is a radial cross-section similar to FIG. 2, showing indifferent embodiment thereof.

DETAILED DESCRIPTION

Figure 1:
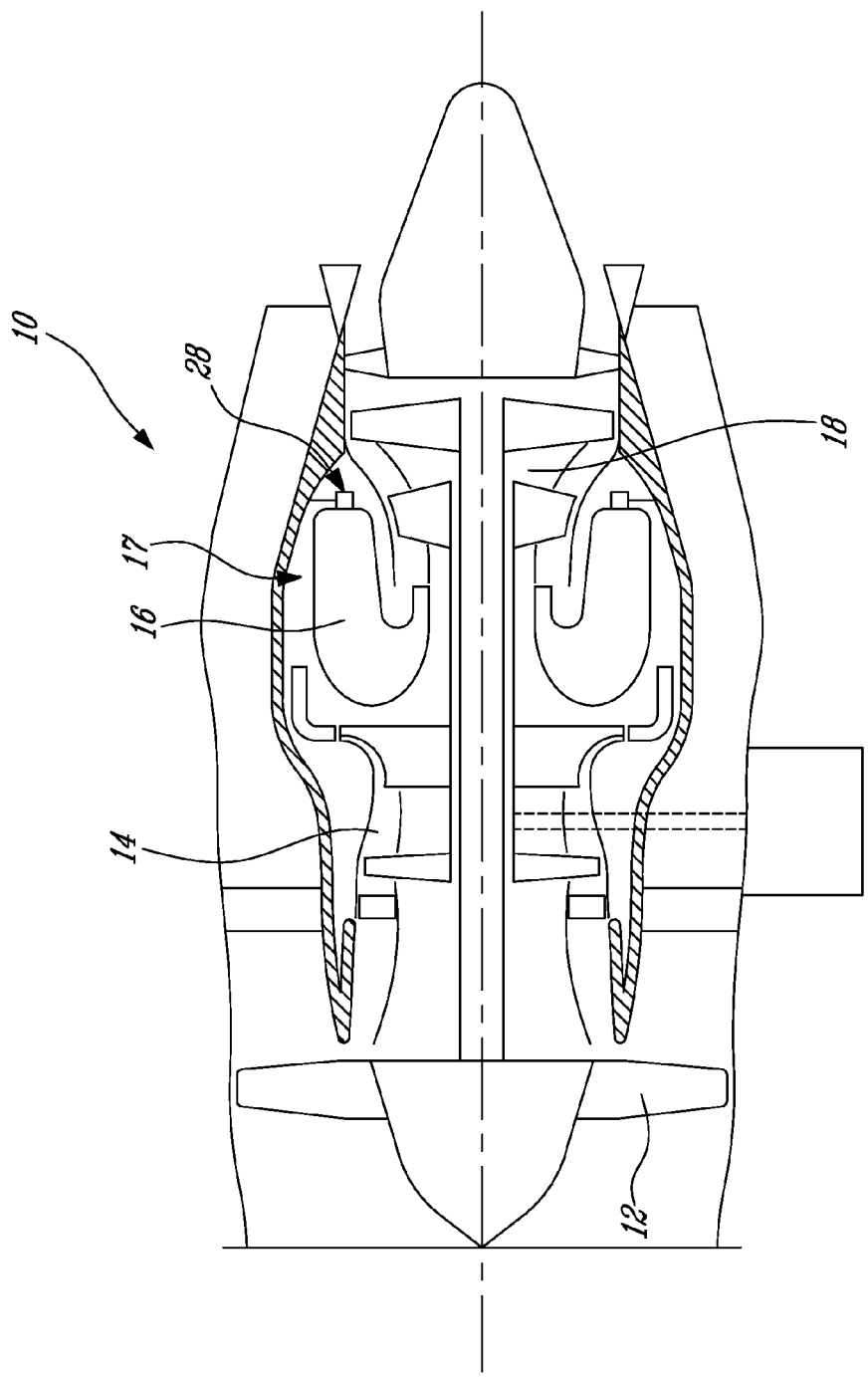
FIG. 1 shows a schematic cross-section of a turbofan gas turbine engine having an annular combustor.

FIG. 1 illustrates a gas turbine engine 10 preferably of a type provided for use in subsonic flight, generally comprising in serial flow communication a fan 12 through which ambient air is propelled, a multistage compressor 14 for pressurizing the air, an annular combustor 16 in which compressed air is mixed with fuel and ignited for generating an annular stream of hot combustion gases which is then redirected by combustor 16 to a turbine section 18 for extracting energy from the combustion gases.

Figure 2:
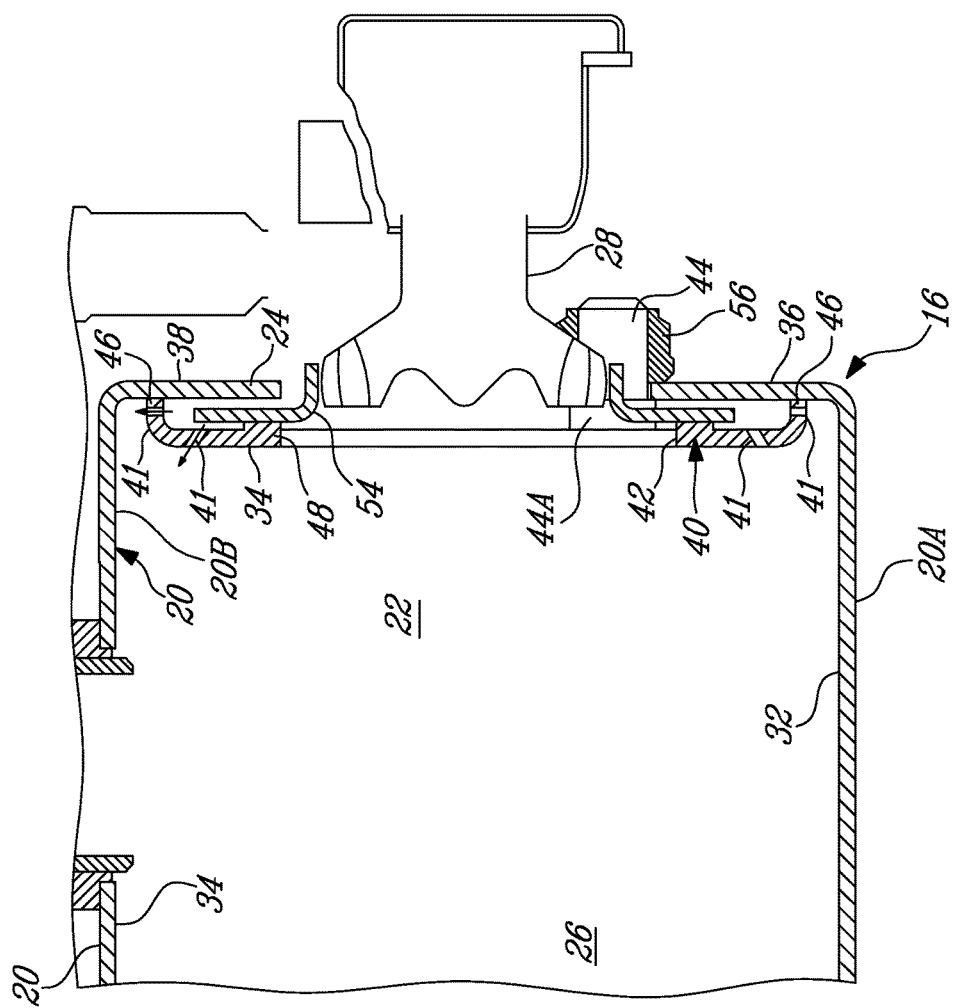
FIG. 2 shows an enlarged radial cross section view of the combustor of FIG. 1.

The combustor 16 is housed in a plenum 17 supplied with compressed air from the compressor 14. As shown in FIG. 2, the combustor 16 comprises a reverse flow annular combustor shell 20 composed of a radially inner liner 20a and a radially outer liner 20b, defining a combustion chamber 22. The combustor 16 has a bulkhead or inner dome portion 24 and an exit portion 26 for communicating combustion gases with the turbine section 18. As shown in FIG. 1, a plurality of fuel nozzle 28 are mounted to extends through the dome portion 24 of the combustor 20 to deliver a fuel-air mixture to the chamber 22.

A plurality of effusion holes (not shown) may be defined in the inner and outer liners 20a and 20b for cooling purposes, and dilution holes (not shown) may also be provided for combustion purposes. Inner and outer liners 20a and 20b may have any suitable configuration. The inner and outer liners 20a and 20b are preferably made out of sheet metal, though any suitable material(s) and manufacturing method(s) may be used. A thermal barrier coating or "TBC" (not shown) may also be applied to the inner combustion facing surfaces 32, 34 of the liners 20a and 20b to protect them against the high temperatures prevailing in the combustion chamber 22.

As shown in FIG. 2, the inner and outer liners 20a and 20b respectively include radial flanges 38 and 36 which overlap each other so as to form part of the dome 24 of the combustor shell 20. The flanges 36 and 38 are directly fixedly secured together by a plurality of circumferentially distributed dome heat shield segments 40a mounted inside the combustion chamber 22 to form and protect the dome 24 from the high temperatures in the combustion chamber 22. Cooling holes 41 are provided at strategic locations on the heat shield 40, as shown in FIG. 2 and as will be described further. The heat shield 40 therefore has an annular configuration which extends substantially 360 degrees about the combustor for protecting a dome portion of the liner. The heat shield is thus disposed internally within the combustor, and covers, or substantially entirely overlies, the internally facing surface of the dome portion of the liner. The heat shield therefore includes a main body portion lying in a plane which is substantially parallel to the dome portion of the combustor liner.

Figure 3A:
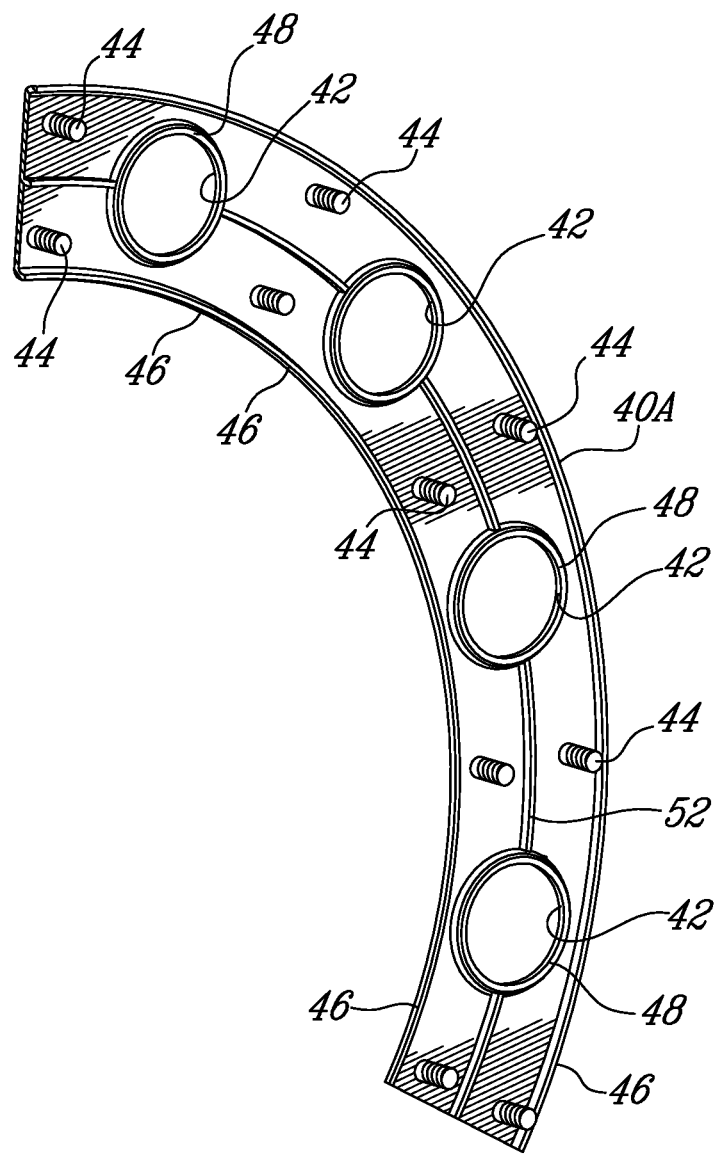
FIG. 3a shows a perspective view of a portion of a heat shield of FIG. 2.

The heat shield 40, as shown in FIGS. 3a and 3b, is made up of at least two segments (only heat shield segment 40a is shown) that are pressed from sheet metal. In one example, the heat shield had a thickness of 0.035 inches and was made from an alloy: INCO 625. The heat shield segments 40a can cover a span of 180° or less. At a minimum, each segment will have at least two openings 42 and will therefore extend over at least two nozzles 28. Whether there are two or more segments in a set, the segments are assembled within the annular combustion chamber 22 during assembly of the latter. Each said heat shield segment 40a is therefore pressed from a sheet metal alloy and includes at least two circumferentially spaced apart openings 42 therein for receiving fuel nozzles therethrough.

Each heat shield segment 40 a will include mounting studs 44. Each stud has a collar 44a. Studs 44 are welded to the sheet metal forming segment 40a by resistance or friction welding. Still referring to FIGS. 3a and 3b, the studs 44 are disposed on one side of the heat shield 40, which is a dome-facing surface of each heat shield segment 40a. The done-facing surface is opposite to the inner combustion facing surface 34. The studs 44 may be threaded to receive suitable nuts or other fasteners. For instance, when assembling the heat shield segments 40a with the flanges 36 and 38, the studs will pass through openings in the flanges 36, 38 to be received by nuts 56. The collar 44a acts as a spacer to provide cooling air space between the flanges 36, 38 and the heat shield 40. The number of studs 44 is related to the number of s 42 in each heat shield segment 40a. FIG. 3a shows four openings 42 in the heat shield segment 40a, and ten studs 44 in the same heat shield segment 40a. In the depicted embodiment, the number of studs 44 on each heat shield segment 40a is less than four times the number of openings 42 in the same heat shield segment 40a. The pressing of the heat shield segment 40a allows lips 46 to be formed along the edges of the heat shield segment as well as lips 48 to be formed around the openings 42. Each of the lips 46 and 48 are provided with a sealing surface 50.

FIGS. 4a and 4b show a divider rib 52 or a press formed divider 152 extending somewhat centrally of the heat shield segment 40a. The divider 52, as shown in FIG. 4b, is friction or resistance welded to the sheet metal forming the heat shield segment 40a. Likewise with the embodiment shown in FIG. 4a the divider 152 is actually pressed from the sheet metal. Although linear dividers are shown, the dividers can have whatever geometry is required to properly distribute the cooling air flow on the upstream surface of the heat shield. The downstream side is coated with a TCB coating. The cooling air enters between the flanges 36 and 38, and the heat shield 40. The cooling air as shown in FIG. 2 is trapped within the space but can exit through the strategically located cooling holes 41.

The heat shield segments 40a as shown in FIG. 3A are assembled to form the annular heat shield 40, as shown in FIG. 2. The heat shield 40 therefore includes at least two separate heat shield segments 40a, each having a partial circumference, which cooperate to provide the fully annular heat shield 40. The heat shield segments 40a are mounted directly to the flanges 36, 38 in a sealing relationship, to form the dome 24. The heat shield 40, formed of the segments 40a, therefore fixedly secures the radially extending flanges 36, 38 of the inner and outer liners of the combustor together in a sealing relationship such as to structurally form the dome portion 24. The floating collar 54 surrounding the nozzle 28 presses against the sealing surfaces 50 of the lips 48. In practice, the cooling air entering the dome area will be directed through the passages between the floating collar 54 and the dome flanges 36,38 and the heat shield 40 to then pass through the cooling openings 41.

In the case of repair the heat shield, it can be readily replaced because of its sheet metal and segmented construction and the segmented construction of the combustor e.g. the shells 20a and 20b. The sheet metal renders the heat shield 40 more flexible while the segmented construction provides easier manipulation of the heat shield segments within the confines of the combustor.

Another embodiment of the heat shield is illustrated in FIG. 5. In this embodiment the heat shield 140 is similar to heat shield 40 in most respects. However the lip 146 along the edges of the heat shield 140 are pressed outwardly from the plane of the heat shield 140 so that when mounted within the combustion chamber 22, the lips 146 are directed, downstream. In this configuration, the cooling airflow is similar to that described in U.S. Pat. No. 7,681,398 issued Mar. 23, 2010 to Patel et al, which is incorporated herein by reference.

The above description is meant to be exemplary only, and one skilled in the art will recognize that changes may be made to the embodiments described without departing from the scope of the invention disclosed. For example, the present approach can be used with any suitable combustor configuration, and is not limited to application in turbofan engines. It will also be understood that the combustor shell construction could be different than the one described. For instance, the dome panel could be integrated to the inner or outer liners. Still other modifications which fall within the scope of the present invention will be apparent to those skilled in the art, in light of a review of this disclosure, and such modifications are intended to fall within the appended claims.

The invention claimed is:

1. A heat shield for a gas turbine engine having a combustor defining a combustion chamber, the combustor being formed by cooperating inner and outer liners, the heat shield comprising an annular configuration extending substantially 360 degrees about the combustor for protecting a dome portion of the combustor which is formed by radially extending flanges of the inner and outer liners, the heat shield fixedly securing the radially extending flanges of the inner and outer liners together in a sealing relationship, the heat shield being disposed internally within the combustor and substantially entirely overlying the dome portion, the heat shield including at least two heat shield segments which are separately formed and cooperate to provide the annular heat shield, each said heat shield segment being sheet metal and including at least two fuel nozzle openings that are circumferentially spaced apart, each heat shield segment including lips extending around each of the fuel nozzle openings, the lips protruding outwardly from the heat shield segment perpendicularly relative to a plane of the heat shield, each of the heat shield segments extending circumferentially uninterrupted, but for the at least two fuel nozzle openings, between first and second circumferentially spaced apart edges, the at least two fuel nozzle openings of each said heat shield segment being circumferentially disposed between the first and second circumferentially spaced apart edges, and the first and second circumferentially spaced apart edges of circumferentially adjacent heat shield segments being mounted end-to-end to form the annular configuration of the heat shield, with each said heat shield segment having a circumferential span not exceeding 180 degrees, the sheet metal heat shield having dome-facing surfaces and a plurality of studs provided on the dome-facing surfaces of each said heat shield segment for fastening the heat shield segment to the radially extending flanges of the inner and outer liners of the combustor, the number of studs on each said heat shield segment being less than four times the number of said circumferentially spaced apart openings in each said heat shield segment, the heat shield having a floating collar within each of the fuel nozzle openings in the dome portion of the combustor, the floating collar axially disposed between the heat shield segment and the radially extending flanges of the inner and outer liners and abuttable against an axially aft surface of the lips extending along each of the fuel nozzle openings, a cooling air passage defined between the floating collar and the radially extending flanges.

2. The heat shield as defined in claim 1, wherein each said segment of the heat shield includes at least one rib stamped from the sheet metal and extending circumferentially along each said heat shield segment, said at least one rib protruding from the heat shield segment perpendicularly relative to a plane of the heat shield.

3. The heat shield as defined in claim 2, wherein the studs extend perpendicularly to said plane of the heat shield.

4. The heat shield as defined in claim 3, wherein the studs are resistance or friction welded to the heat shield.

5. The heat shield as defined in claim 1, wherein the heat shield having a main body portion lying in a plane which is parallel to the dome portion formed by the radially extending flanges of the inner and outer liners of the combustor.

6. The heat shield as defined in claim 1, wherein the heat shield consists of only two heat shield segments, each spanning 180 degrees.

7. A gas turbine engine combustor comprising a liner enclosing a combustion chamber and being formed of cooperating inner and outer liners, an annular heat shield mounted inside the combustor adjacent a dome portion of the combustor which is formed by radially extending flanges of the inner and outer liners, the annular heat shield being axially spaced apart from the dome portion to define an air space therebetween, the annular heat shield fixedly securing the radially extending flanges of the inner and outer liners together in a sealing relationship, the dome portion of the combustor and heat shield each having a plurality of circumferentially spaced apart fuel nozzle openings which are respectively circumferentially aligned to receive fuel nozzles, the heat shield further comprising at least two segments which are separately formed, each of the segments including lips extending along each of the fuel nozzle openings, the lips protruding outwardly from the heat shield segment perpendicularly relative to a plane of the heat shield, each of the segments of the heat shield extending circumferentially uninterrupted, but for the fuel nozzle openings, between first and second circumferentially spaced apart edges, the plurality of fuel nozzle openings of each said segment being circumferentially disposed between the first and second circumferentially spaced apart edges, and the first and second circumferentially spaced apart edges of circumferentially adjacent ones of the segments being mounted end-to-end to form the annular heat shield, each said segment being sheet metal and including at least two of said fuel nozzle openings, and wherein each said segment has a circumferentially extending span not exceeding 180 degrees, the heat shield segments made of sheet metal having dome-facing surfaces, and a plurality of studs provided on the dome-facing surfaces of each of the heat shield segments for fastening the heat shield segments to the radially extending flanges of the inner and outer liners of the combustor, the number of studs on each said heat shield segment being less than four times the number of said fuel nozzle openings in each of the heat shield segments, a floating collar disposed within each of the fuel nozzle openings, the floating collar axially disposed in the air space between the heat shield and the dome portion and abuttable against an axially aft surface of the lips extending along each of the fuel nozzle openings, a cooling air passage defined between the floating collar and the radially extending flanges of the dome portion.

8. The combustor as defined in claim 7, wherein the segments of the annular heat shield includes at least one rib projecting from the sheet metal and extending circumferentially along each said segment, said at least one rib protruding axially from the heat shield segment perpendicularly relative to a plane within which the heat shield segment lies.

9. The combustor as defined in claim 8, wherein the at least one rib protrudes an axial distance from the segment which corresponds to the air space defined between the heat shield and the dome portion of the combustor.

10. The combustor as defined in claim 1, wherein each said stud includes a shank in a collar, with the collar being adjacent the heat shield and extending an axial distance corresponding to an air space defined between the heat shield and the dome portion of the combustor.

11. The combustor as defined in claim 10, wherein the shank of each said stud is threaded to receive a nut when the heat shield is fastened to the radially extending flanges of the inner and outer liners.

12. The combustor as defined in claim 9, wherein each of the at least one ribs provides a sealing surface which sealingly abuts an inner surface of the dome portion of the combustor.

13. The combustor as defined in claim 7, wherein cooling air holes are provided at strategic locations on the heat shield, the cooling air holes provided air flow communication between said air space, defined between the heat shield and the dome portion of the combustor, and an inwardly facing surface of the heat shield facing said combustion chamber.

14. The combustor as defined in claim 12, wherein the floating collar is adapted to sealingly engage the sealing surfaces of the at least one ribs when cooling air is directed against the floating collar.

15. The combustor as defined in claim 8, wherein the at least one rib is stamped from the sheet metal heat shield and extends in a direction downstream from the liner.

16. The combustor as defined in claim 7, wherein a circumferentially extending divider protrudes from the heat shield to form circumferential cooling air channels.

17. The combustor as defined in claim 16, wherein the divider is welded to or stamped from the sheet metal forming said heat shield segments.

18. The heat shield as defined in claim 1, wherein each said heat shield segment has a circumferential span equal to 180 degrees.

19. The combustor as defined in claim 7, wherein each said heat shield segment has a circumferential span equal to 180 degrees.

20. The combustor as defined in claim 7, wherein the heat shield consists of only two heat shield segments, each spanning 180 degrees.

* * * * *